United States Patent [19]

Fischer et al.

[11] Patent Number: 4,810,049

[45] Date of Patent: Mar. 7, 1989

[54] REDUCING BEND AND COUPLING LOSSES IN INTEGRATED OPTICAL WAVEGUIDES

[75] Inventors: Frederick H. Fischer, Lower Macungie Township, Lehigh County; Edmond J. Murphy, Bethlehem; Trudie C. Rice, Weisenberg Township, Lehigh County, all of Pa.

[73] Assignee: American Telephone and Telegraph Company, AT&T Bell Laboratories, Murray Hill, N.J.

[21] Appl. No.: 34,128

[22] Filed: Apr. 2, 1987

[51] Int. Cl.[4] ............................................. G02B 6/12
[52] U.S. Cl. ............................. 350/96.12; 350/96.15; 350/96.17
[58] Field of Search ............... 350/96.11, 96.12, 96.17, 350/96.15

[56] References Cited

U.S. PATENT DOCUMENTS 4,598,039 7/1986 Fischer et al. ...................... 430/323

FOREIGN PATENT DOCUMENTS 61-117513 6/1986 Japan ................................. 350/96.17

OTHER PUBLICATIONS

Sheem et al., "Guiding by Single Curved Boundaries in Integrated Optics", *Wave Electronics*, V. 1, pp. 61–68, Jan. 1974.

Geshiro et al., "A Method for Diminishing Total Transmission Losses in Curved Dielectric Optical Waveguides", *IEEE Transactions on Microwave Theory and Techniques*, vol. MTT-29, No. 11, Nov. 1981, pp. 1182–1187.

Neumann, "Low Loss Dielectric Optical Waveguide Bends", *Fiber and Integrated Optics*, vol. 4, No. 2, pp. 203–211, 1982.

Neumann et al., "Sharp Bends with Low Losses in Dielectric Optical Waveguides", *Applied Optics*, vol. 22, No. 7, Apr. 1983, pp. 1016–1022.

"Dielectric Optical Waveguide Tilts with Reduces Losses", European Conference on Optical Communication, Sep. 1981, Neumann, pp. 9.3–1 through 9.3–4.

IEEE Journal of Quantum Electronics, vol. QE-18, No. 10, Oct. 1982, "Low-Loss Ti:LiNbO$_3$ Waveguide Bends at $\lambda = 1.3$ $\mu$m," William J. Minford, Steven K. Korotky, and Rod C. Alferness, pp. 1802 through 1806.

"Greatly Reduced Losses for Small-Radius Bends in Ti:LiNbO$_3$ Waveguides", S. K. Korotky, E. A. J. Marcatili, J. J. Veselka, R. H. Bosworth, AT&T Bell Laboratories, Holmdel, NJ.

"Improved Relations Describing Directional Control in Electromagnetic Wave Guidance", E. A. J. Marcatili, S. E. Miller, manuscript received Jan. 22, 1969, pp. 2161 through 2188, Bell System Technical Journal, Sep. 1969.

*Primary Examiner*—John D. Lee
*Attorney, Agent, or Firm*—Scott W. McLellan

[57] ABSTRACT

A groove is disposed in a substrate longitudinally along the outside radius of a bent integrated optical waveguide to constrain the mode of optical energy propagating therein such that the optical energy that would normally be radiated is confined to the waveguide, thereby reducing transmission loss through the bend. Further, to reduce coupling loss between an integrated optical waveguide and an optical fiber, two grooves are disposed longitudinally along either side of the integrated optical waveguide to constrain the mode of optical energy propagating in the waveguide to approximate the mode of the optical energy propagating in the optical fiber. To further reduce both bend and coupling losses, the ends of the grooves bend away from the waveguide.

37 Claims, 2 Drawing Sheets

REDUCING BEND AND COUPLING LOSSES IN INTEGRATED OPTICAL WAVEGUIDES

FIELD OF THE INVENTION

This invention relates generally to integrated optics, and more particularly, to reducing bend loss in integrated optical waveguides and coupling loss between the integrated optical waveguide and an external optical waveguide or optical fiber.

BACKGROUND OF THE INVENTION

It is well known that optical devices, such as modulators, directional couplers, polarizers, etc., can be integrated into a common layer of optical material, referred to here as a substrate. A suitable layer of optical material typically has a transmission loss of less than 10 db per centimeter (db/cm) at a desired optical wavelength. More typically, the loss is less than a few tenths of a db/cm. The material is usually chosen to have electro-optic properties when integrating electro-optical devices such as modulators. For example, lithium niobate (LiNbO3) is widely used for this purpose. However, where electro-optical devices are not necessary, other materials, including glass, may be used. Each type of optical device employs integrated optical waveguides for both fabrication and interconnection of the optical devices on a common substrate. To form optical waveguides in the substate, a common technique involves selectively diffusing titanium into the substrate where a waveguide is desired. These waveguides typically have very low transmission loss (typically tenths of a db per cm.) along straight sections of waveguide. However, should the direction of the waveguide change (a bend), the loss increases significantly in relation with the radius of curvature of the bend. Such losses are discussed in "Improved Relations Describing Directional Control in Electromagnetic Wave Guidance", by Marcatili and Miller, Bell System Technical Journal, Vol. 48, No. 7 (Sept. 1969), pp. 2161–2188. In summary, the losses are caused by two mechanisms: radiation loss caused by the energy distribution (Gaussian) of the light in the waveguide, being non-zero outside of the waveguide, into a region capable of supporting a radiating wave, and mode conversion loss by the light coupling to lossy higher order modes as it changes direction. Such losses limit the radius of curvature of a bend in an integrated optical waveguide for a predetermined amount of loss, resulting in optical devices and interconnection of which are physically large on the substrate. This places a limit on the number of such devices that can be constructed on a given substrate size. One technique which may be used in reducing bend loss is disclosed in an article titled "Dielectric Optical Waveguide Tilts With Reduced Losses", by E. G. Neumann, published in the proceedings of the Seventh European Conference on Optical Communication, Sept. 8–11, 1981, pp. 9.3-1 to 9.3-4. The technique involves modifying the refractive index of the substrate surrounding the curve (tilt) of a waveguide therein to refract the energy propagating in the waveguide around the turn. As shown in FIG. 1d, the index of refraction of the substrate in contact with the outside of a turn of the waveguide is modified to be lower than that of the substrate to speed up the propagation of energy outside of the waveguide. Another technique for reducing bend loss is disclosed in "Greatly Reduced Losses for Small-Radius Bends in Ti:LiNbO3 Waveguide", by S. K. Korotky, et al, published in the proceedings for the Third European Conference on Integrated Optics, May 6–8, 1985, pp. 207–209. This technique, referred to as CROWNING and applied to curved waveguides formed in a substrate, varies the refractive index inside the waveguide by a plurality of dielectric prisms so as to locally influence the direction of light propagation. However, an extra diffusion step is required to form the prisms, scattering loss is increased by the introduction of features (prisms) within the waveguide and this technique is wavelength dependent.

To be practical, the optical devices on the common substrate must couple to the "outside" world. A common technique uses optical fibers to couple optical energy to and from the integrated optical devices. For example, an optical fiber couples light from an external laser to the substrate for modulation by a modulator formed in the substrate and a second optical fiber couples the so modulated light to a distant optical receiver. For integrated optical waveguides, of which the exemplary modulator is constructed, the mode of propagating optical energy is typically oval in shape. However, the mode of optical energy propagating in the fiber light-guide is typically circular. Because the modes in each type of waveguide (integrated optical waveguide and optical fiber) are not substantially the same at the interface between the two waveguides, full optical energy transfer between the waveguides does not occur. The inefficiency of optical energy transfer between the optical fiber and the integrated optical waveguide due to the mode mismatch is included in the coupling loss.

SUMMARY OF THE INVENTION

We have invented a means for reducing the optical energy loss at bends in an integrated optical waveguide by having a groove disposed longitudinally along the outside radius of the bent optical waveguide. The waveguide is typically formed in a substrate of lithium niobate (LiNbO3) and having titanium selectively diffused therein. Further, each end of the groove may bend away from the optical waveguide to further reduce loss.

We have also invented a means for reducing coupling losses between an integrated optical waveguide and an external optical waveguide optical fiber. Here, the integrated optical waveguide disposed in a substrate has at least one groove disposed longitudinally along a side of the optical waveguide to constrain the mode of the optical energy propagating therein to approximate the mode in the external optical waveguide.

DETAILED DESCRIPTION

Figure 1:
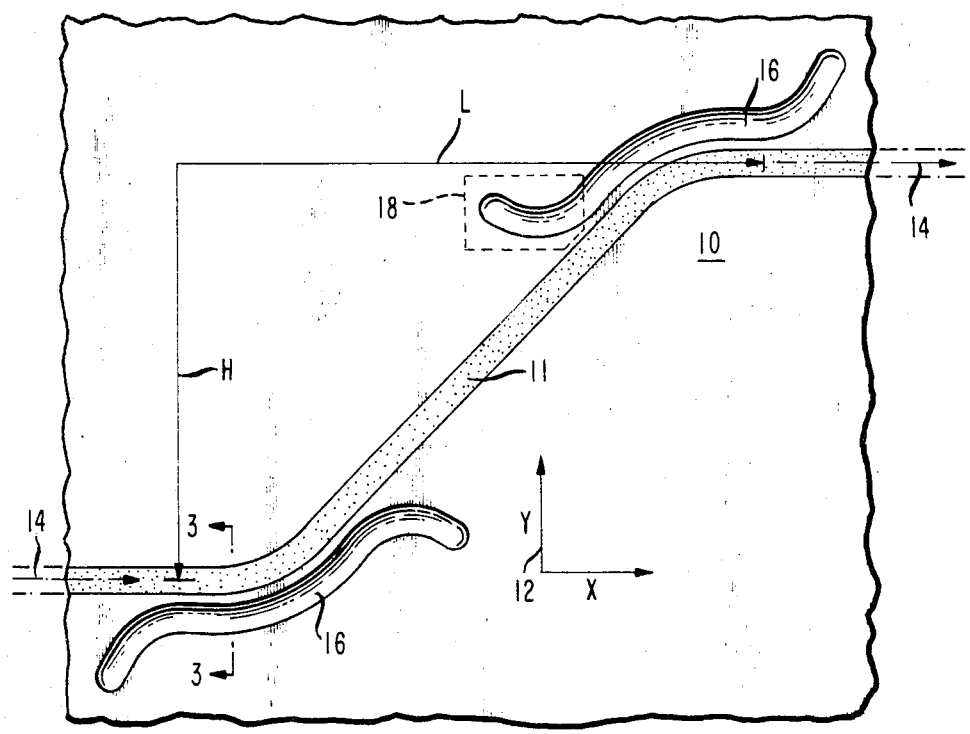
FIG. 1 shows the preferred embodiment of the invention in reducing optical energy loss at bends in an integrated optical waveguide.

Referring to FIG. 1, an S-shaped optical waveguide 11 in a substrate 10 in which reduction of the bend loss in the S-shaped waveguide 11 is illustrated. By waveguide we mean a selectively formed region of optical material for propagating optical energy therein. The waveguide has a typical transmission loss of less than 10 db per centimeter (db/cm) at a desired optical wavelength. The shape of the waveguide 11 is used as a benchmark in the comparison of different bend loss reduction techniques; our bend loss reduction technique may be applied to any waveguide bend geometry. The waveguide 11 is formed in the substrate 10, the curve of which is described by:

$$Y(X) = HX/L - H[\sin(2X\pi/L)]/2\pi;$$

where H is the transition height, L is the transition length and the X and Y direction shown by the axis 12. The waveguide 11 is formed in the substrate by a variety of techniques, an exemplary one is the selective diffusion of titanium (or nickel or vanadium) into a single crystal substrate of lithium niobate ($Ti:LiNbO_3$), a birefringent and electro-optical material, using photolithographic techniques to selectively increase the index of refraction therein.

However, it is understood that other waveguide formation techniques and different substrates may be used. Exemplary other substrates, having electro-optic properties, include strontium barium niobate ($SrO.6-4BaO.36Nb_2O_6$) and lithium tantalate ($LiTaO_3$). Should electro-optic properties not be desired, other substrates, including glass, may be used. Optical energy is shown propagating through the waveguide 11 in the direction indicated by arrows 14. However, it is understood that the direction of propagation of the optical energy is shown for illustrative purposes and may alternatively be in the opposite direction. Two grooves 16, formed along the outside radii of the S-curved waveguide 11 reduces the loss due to radiation at the bends in the waveguide 11. It is understood that the depth of grooves 16 in the substrate need only be as deep as the optical energy field that is to be constrained outside of the waveguide 11. In practice, however, the depth of the grooves 16 typically exceeds that of the waveguide 11. The grooves 16 may be formed using laser etching of the substrate, such as disclosed in our U.S. Pat. No. 4,598,039, issued July 1, 1986, titled "Formation of Features in Optical Material", and assigned to AT&T Bell Laboratories. It is understood that other groove formation techniques, including reactive ion etching, may be used to form the grooves 16.

Figure 2:
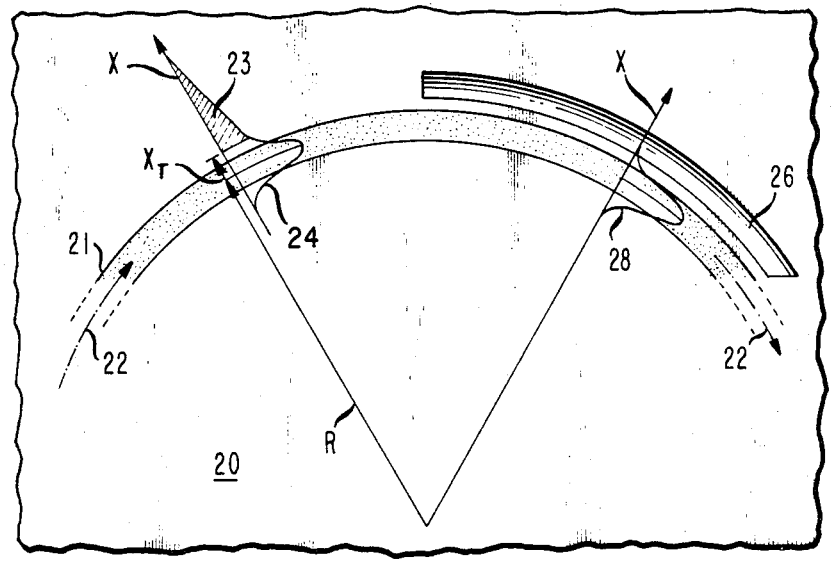
FIG. 2 is a diagram showing optical energy distribution (mode) in a curved optical waveguide formed in a substrate and the effect on the distribution by a groove adjacent to the waveguide.

Referring temporarily to FIG. 2, radiation loss mechanisms and the bend loss reduction technique used in FIG. 1 are illustrated. An exemplary curved waveguide 21 is formed into a substrate 20 having a radius R and optical energy is shown propagating in the direction indicated by arrows 22. It is understood that the direction is shown for illustrative purposes and may alternatively be in the opposite direction. Distribution of the optical energy in the waveguide 21 is illustrated by curve 24, having essentially a Gaussian distribution with the transverse field decaying exponentially outside of the waveguide 21. Since optical energy propagating beyond radius $X_r$ in phase with optical energy propagating in the waveguide 21 must do so at velocities above the speed of light, (the velocity of the optical energy propagating in the waveguide being near the speed of light) the optical energy beyond $X_r$ will be lost to radiation, as represented by shaded region 23. This increases the bend loss to optical energy passing through the waveguide 21. The optical energy lost due to radiation loss propagates through the substrate 20 where it is dissipated. To reduce the radiation loss, a groove 26 is disposed adjacent to, and along the outside radius of, the waveguide 21 with a depth typically greater than the depth of the optical energy field outside of waveguide 21 in the substrate 20 and an index of refraction lower than that of the substrate 20. This technique confines the distribution of the optical energy beyond the waveguide 21 to reduce the bend loss, as illustrated by optical energy distribution curve 28. The outer tail of the distribution curve 28 is shortened from that in curve 24, confirming optical energy that was in region 23 to the waveguide 21, thereby essentially eliminating the radiation loss of the curved waveguide 21. Placement of the groove 26 dictates the amount of radiation loss eliminated. The further the groove 26 is displaced from the waveguide 21 beyond the distance $X_r$, the more of the optical energy lost to radiation.

Returning to FIG. 1, the present technique in one embodiment includes bending the ends of the grooves 16 away from the waveguide 11, an example of which is shown in region 18. The bend in the groove 16 reduces the effect of discontinuities in the optical energy distribution 24 (FIG. 2) in the vicinity of the groove 16. Such discontinuities increase the amount of bend loss by scattering the optical energy in region 23 of distribution curve 24 (FIG. 2) when the optical energy strikes the grooves 26 (FIG. 2). The bend is shown here to have an exponential shape; however other bend shapes may be used, such as quadratic. Applying the above technique to an experimental curved integrated optical waveguide 11, described by the above equation and having a length of 1.64 mm but without bending the ends of the grooves 16 away from the waveguide 11, the bend loss of the waveguide was reduced from approximately 18.7 db to approximately 8.6 db with 1.3 micron transverse magnetic (TM) optical energy propagating therein. The grooves 16 were each placed approximately 1.5 and 2 microns from the waveguide 11.

Figure 3:
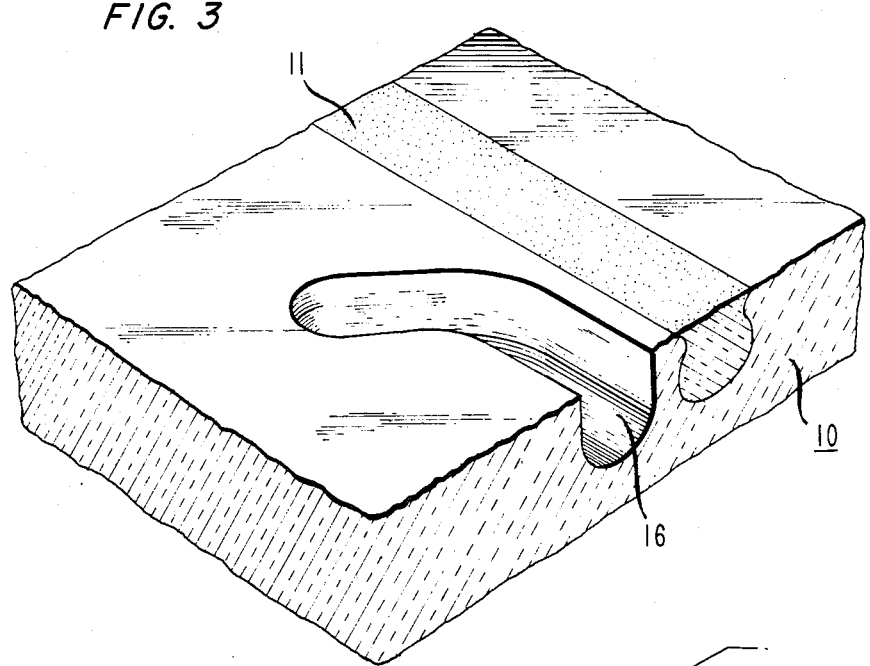
FIG. 3 is a cross-sectional view of the preferred embodiment in FIG. 1.

Referring to FIG. 3, a cross-sectional illustration of the optical waveguide 11 and groove 16 taken along the line 3—3 in FIG. 1 is shown. Here, groove 16 is shown adjacent to waveguide 11 in substrate 10. The groove 16 is shown to have a depth exceeding that of the waveguide 11 and the end of groove 16 bends away from the the waveguide 11.

Figure 4:
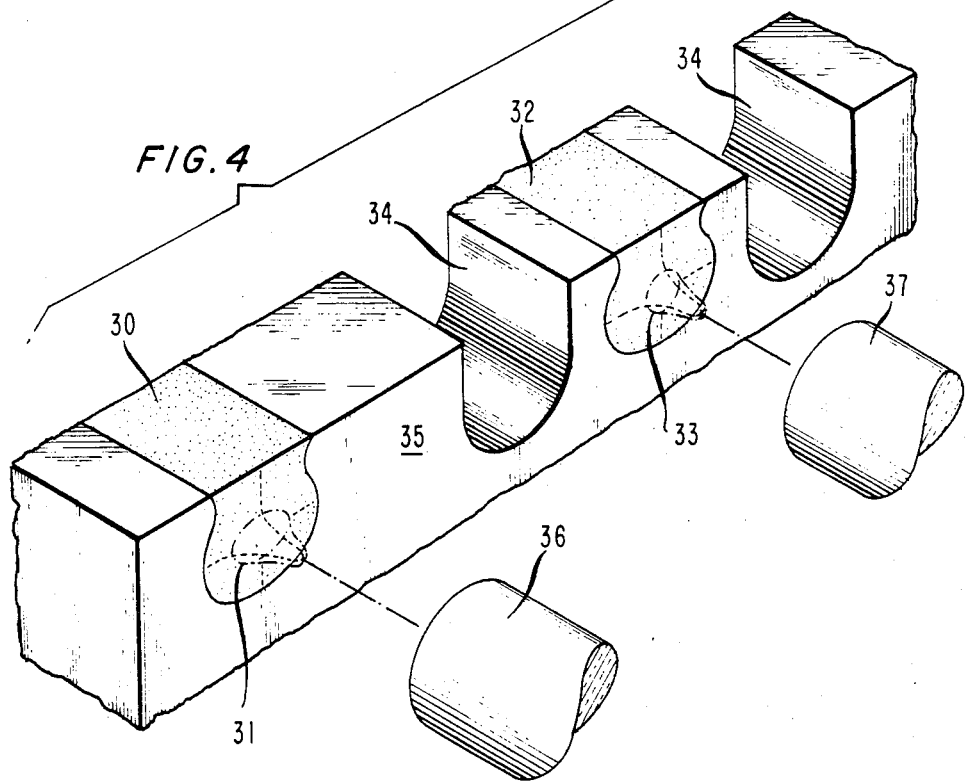
FIG. 4 shows the preferred embodiment of the invention in reducing coupling losses between an integrated optical waveguide and an external optical waveguide, such as an optical fiber.

A second embodiment of the present invention is illustrated in FIG. 4, wherein two integrated waveguides at the edge of a substrate are shown with three-dimensional plots of the optical energy distribution (modes) from the waveguides. The integrated optical waveguides 30 and 32 couple to external optical waveguides, such as optical fibers 36 and 37 (each shown here as a core without cladding), for coupling optical energy to and from the optical fibers 36 and 37 and optical devices (not shown) on substrate 35. The two waveguides 30 and 32 are formed into substrate 35 using the materials and methods described above. A consequence of the diffusion process to make the waveguides 30 and 32 in substrate 35 is the semicircular shape of the resulting waveguides 30 and 32. Hence the mode 31 of the optical energy from waveguide 30 is oval due to the semicircular shape of the waveguide 30. Since the mode of optical energy in the external optical fiber 36 is typically circular, coupling optical energy to or from the integrated optical waveguide 30 and the optical fiber 36 introduces coupling losses due to the different mode shapes. However, with waveguide 32, having the same geometry as waveguide 30, the mode 33 of optical energy is more nearly circular. Here two grooves 34, disposed longitudinally along each side of the waveguide 32 and placed a predetermined distance therefrom, constrains the optical energy distribution 33 in waveguide 32 to be more circular. Hence the mode 33 and the mode in the optical fiber are more similar, allowing lower coupling loss between them. It should be noted that optical fibers 36 and 37 need not have circular modes. Further, other external waveguides, such as integrated optical waveguides having a different geometry and mode from that of waveguides 30 and 32, may couple to waveguides 30 and 32. To efficiently transfer optical energy between the waveguide 32 and the external waveguide, the grooves 34 are placed to constrain the mode 33 to approximate the mode in the external waveguide.

While a groove has been noted above in the bend loss reduction and mode constraint embodiments, the groove need not be filled with air. The groove may be at least partially filled with a solid material; however it is desirable that the index of refraction of the material be less than that of the substrate. Further, the depth of the grooves in the substrate is desirably at least equal to the depth of the peak of the optical energy field to be constrained outside of the corresponding waveguide. However, forming the groove to a lesser depth is alternatively possible, with a corresponding reduction in the benefit obtained. Typically, the groove depth is at least 25% of the depth of the corresponding waveguide, and is usually greater than the depth of the waveguide.

Having described the preferred embodiment of the invention, it is felt, therefore, that the invention should not be limited to the described embodiment, but rather should be limited only by the scope and spirit of the appended claims.

What is claimed is:

1. A curved waveguide selectively formed in a layer of optical material for propagating optical energy therein, characterized by:
   means, having two ends and a different index of refraction than the optical material, juxtapositioned to the waveguide and disposed longitudinally along the outside radius of the waveguide with at least one end of the means bending away from the waveguide, for constraining the optical energy to the waveguide.

2. The waveguide of claim 1 wherein the optical material is a birefringent material.

3. The waveguide of claim 1 wherein the optical material is a single crystal.

4. The waveguide of claim 1 wherein the optical material is a compound comprising at least one metallic species.

5. The waveguide of claim 4 wherein the metallic species is selected from the group consisting of lithium, niobium, tantalum, strontium and barium.

6. The waveguide of claim 1 wherein the waveguide has diffused therein at least one metallic species.

7. The waveguide of claim 6 wherein the metallic species is selected from the group consisting of titanium, nickel and vanadium.

8. The waveguide of claim 1 wherein the optical material is an electro-optic material.

9. The waveguide of claim 8 wherein the electro-optic material is selected from the group consisting of lithium niobate, strontium barium niobate and lithium tantalate.

10. The waveguide of claim 1 wherein the index of refraction of the means is less than that of the optical material.

11. The waveguide of claim 10 wherein the means is a groove in the surface of the optical material.

12. The waveguide of claim 11 wherein the groove is at least partially filled with a solid filling material.

13. The waveguide of claim 12 wherein the filling material has a lower index of refraction than the optical material.

14. The waveguide of claim 11 wherein the groove is disposed a predetermined distance from the curved waveguide.

15. The waveguide of claim 11 wherein the bend in the end of the groove has an exponential shape away from the waveguide.

16. The waveguide of claim 11 wherein the depth of the grooves in the optical material is at least 25% of the depth of the waveguide in the optical material.

17. The waveguide of claim 16 wherein the depth of the groove in the optical material at least equals the depth of the waveguide in the optical material.

18. The waveguide of claim 11 wherein the waveguide couples to at least one integrated optical device formed in the optical material.

19. A waveguide selectively formed in a layer of optical material and adapted to couple optical energy between the waveguide and an external waveguide, characterized by:
   at least one means, having a different index of refraction than that of the optical material and disposed longitudinally along side of the waveguide at a predetermined distance therefrom, for constraining the optical energy to the waveguide;
   wherein the cross-sectional optical energy distribution (mode) within the waveguide is constrained on at least one side by at least one means to approximate the mode in the external waveguide.

20. The waveguide of claim 19 wherein the optical material is a birefringent material.

21. The waveguide of claim 19 wherein the optical material is a single crystal.

22. The waveguide of claim 19 wherein the optical material is a compound comprising at least one metallic species.

23. The waveguide of claim 22 wherein the metallic species is selected from the group consisting of lithium, niobium, tantalum, strontium and barium.

24. The waveguide of claim 19 wherein the waveguide has diffused therein at least one metallic species.

25. The waveguide of claim 24 wherein the metallic species is selected from the group consisting of titanium, nickel and vanadium.

26. The waveguide of claim 19 wherein the optical material is an electro-optic material.

27. The waveguide of claim 26 wherein the electro-optic material is selected from the group consisting of lithium niobate, strontium barium niobate and lithium tantalate.

28. The waveguide of claim 19 wherein the index of refraction of the means is less than that of the optical material.

29. The waveguide of claim 28 wherein the means is a groove in the surface of the optical material.

30. The waveguide of claim 29 wherein the groove is at least partially filled with a solid filling material.

31. The waveguide of claim 30 wherein the filling material has a lower index of refraction than the optical material.

32. The waveguide of claim 29 wherein an end of the groove bends away from the waveguide.

33. The waveguide of claim 32 wherein the end of the groove bends away exponentially from the waveguide.

34. The waveguide of claim 29 wherein the depth of the grooves in the optical material is at least 25% of the depth of the waveguide in the optical material.

35. The waveguide of claim 34 wherein the depth of the groove in the optical material exceeds the depth of the waveguide in the optical material.

36. The waveguide of claim 29, wherein the external waveguide is an optical fiber.

37. The waveguide of claim 29 wherein the waveguide couples to at least one integrated optical device formed in the optical material.

* * * * *